June 11, 1940.   W. SAMANS   2,204,447
HEAT EXCHANGE APPARATUS
Filed July 16, 1938

WITNESS:

INVENTOR
Walter Samans
BY
ATTORNEYS.

Patented June 11, 1940

2,204,447

UNITED STATES PATENT OFFICE 2,204,447

HEAT EXCHANGE APPARATUS

Walter Samans, Philadelphia, Pa., assignor, by mesne assignments, to Houdry Process Corporation, Wilmington, Del., a corporation of Delaware Application July 16, 1938, Serial No. 219,567

6 Claims. (Cl. 257—224)

This invention relates to heat exchange apparatus, and more particularly to a compact apparatus for securing heat exchange uniformly between a fluid being subjected to chemical processing and a fluid provided for heat interchange with the first fluid.

In various chemical processes involving the generation or absorption of heat by a reacting substance, it is important that the temperature be maintained within relatively narrow limits throughout the entire quantity of the material during the chemical reaction in which it is involved. This is particularly true in reactions involving the use of catalysts in finely divided form, in which case it is relatively difficult to insure substantially uniform temperature and heat exchange conditions throughout the body of the catalyst.

It is the primary object of the present invention to provide an apparatus in which heat exchange maye be closely controlled with consequent substantial uniformity of the reacting conditions. Other objects of the present invention relate particularly to details of construction whereby large quantities of materials may be treated under controlled conditions with a minimum of complication and in a minimum space.

Figure 1:
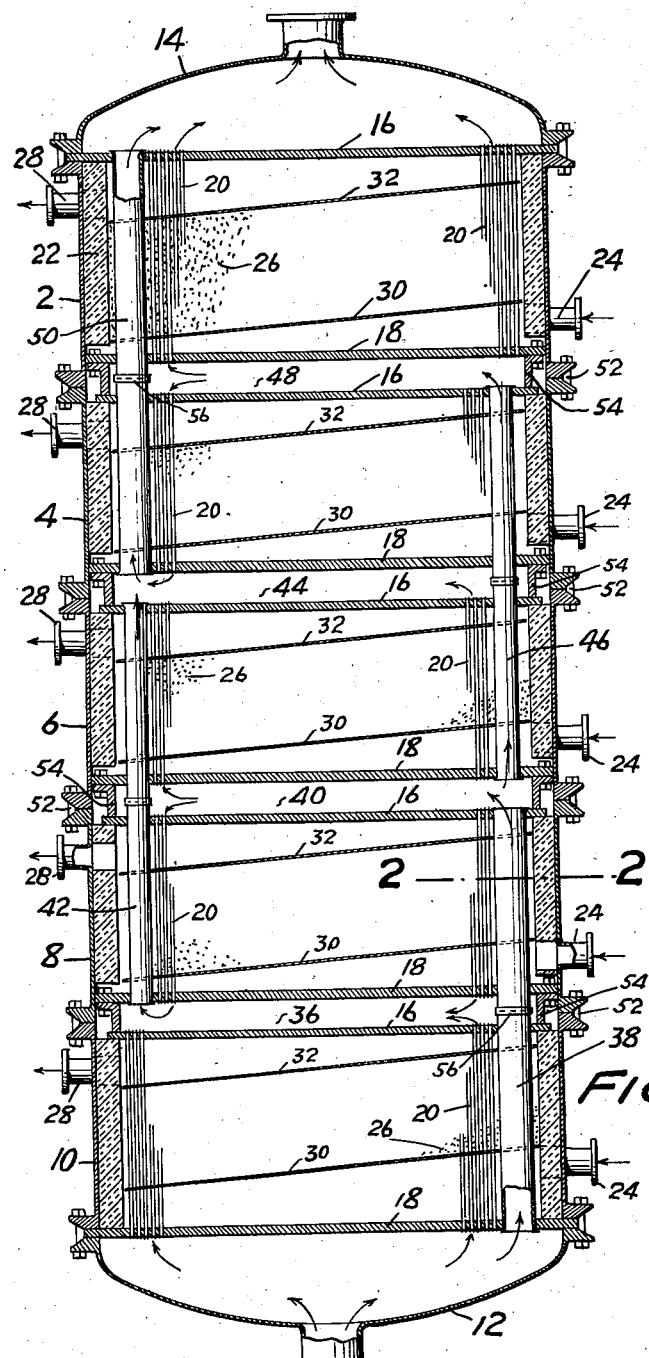
Figure 2:
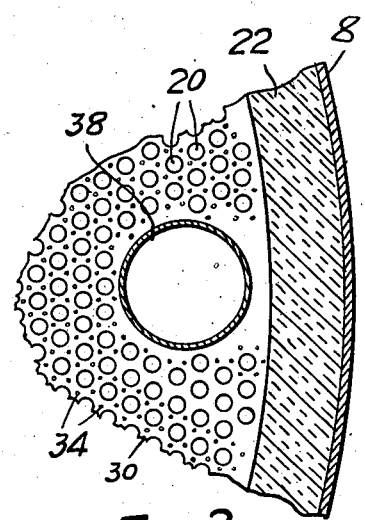

The above and other objects of the invention, particularly relating to details, will become apparent from the following description read in conjunction with the accompanying drawing, in which:

Figure 1 is a vertical sectional view through a heat exchange apparatus embodying the principles of the invention; and Figure 2 is a section taken on the plane the trace of which is indicated at 2—2 in Figure 1.

As disclosed in Figure 1, the apparatus is particularly designed for the catalytic treatment of materials such as petroleum hydrocarbons. The hydrocarbons in vaporized condition pass through regions containing finely divided catalyst under conditions involving the absorption of heat. Heat is applied through the medium of a hot fluid distributed uniformly in heat exchange relationship with the catalyst. Subsequently, regeneration of the catalyst may take place by blowing air through it with a second generation of heat due to the burning of carbonaceous material, whereupon the heat exchange fluid is used to absorb the heat generated to make it available for other use. The present invention is not concerned with any particular heat exchange process, but merely with the apparatus for effectively providing heat exchanges of either or both of the types generally indicated above.

The improved heat exchange apparatus comprises a series of cylindrical sections 2, 4, 6, 8 and 10 and, in addition, an entrance header 12 and discharge header 14 for the heat exchange fluid, which in general will be a liquid, though it may be in vapor or gaseous condition. Each of the sections just enumerated is provided with upper and lower tube sheets 16 and 18, respectively, supporting tubes 20 extending vertically between them. The enclosures formed by the cylindrical walls of the sections and the tube sheets and surrounding the tubes 20 may be insulated by cylindrically insulating material indicated at 22. The primary fluid involved in the chemical reactions may enter each of the enclosures at 24 and leave at 26, so as to pass in a generally upward direction through, for example, a body of catalyst located in the spaces between the tubes 20 and held between distributing screens 30 and 32 provided with openings for the tubes 20 and additionally provided with fine openings such as those indicated at 34 in Figure 2 permitting the flow of the reacting material. The fine openings may be provided merely by enlarging or notching the openings for the tubes. Thus each of the enclosures is provided with lower and upper clear spaces and an intermediate space containing catalyst. The clear spaces provide for uniform distribution of the material being treated across each of the enclosures to provide a uniform flow through the catalyst. The screens 30 and 32 are preferably sloping as indicated in Figure 1 to promote this even distribution.

The arrangement of the tube sheets 16 and 18 provides a number of chambers between the sections, as indicated at 36, 40, 44 and 48. Of these chambers, 36 and 44 may be considered gathering chambers and chambers 40 and 48 distributing chambers for the secondary heat exchange fluid.

Extending from the lower header 12 upwardly to communicate with the chamber 40 is a relatively large tube 38. By reason of this arrangement, the secondary fluid flows upwardly through the tubes 20 of the lowermost section 10 into the gathering chamber 36 and simultaneously flows upwardly through the tube 38 into the distributing chamber 40 and thence downwardly into the gathering chamber 36. Discharge of the fluid from chamber 36 takes place through the upwardly extending tube 42 into a second gathering chamber 44.

The tube 38 not only provides fluid for downward passage through the tubes of the section 8, but also provides fluid for the passage upwardly through the tubes 20 of section 6 of the second gathering chamber 44 and also through the tube 46 into a second distributing chamber 48 from which flow takes place downwardly through tubes 20 of section 4. The gathering chamber 44 thus receives the fluid flowing through the tubes of sections 4 and 6. This fluid is discharged through the tube 50 along with the fluid entering chamber 44 through tube 42 and is guided by the tube 50 to the upper header 14. Additionally, the header 14 receives the fluid flowing from the distributing chamber 48 upwardly through the distributing tubes 20 of section 2.

The flow through the catalyst parallel to the tubes is preferable, giving the maximum length of path for the vapor through the catalyst with short lengths of cooling medium tubes to limit maximum lateral distortion resulting from variations of temperature during the regeneration period.

The arrangement thus described provides by reason of the proper relative proportioning of the tubes 38, 42, 46 and 50 a substantially uniform flow of heat exchange fluid at uniform temperature through all of the groups of tubes 20 of the various sections. The tube 38 has approximately twice the fluid capacity of the tube 46, both being proportioned with respect to the total cross-sectional areas of the tubes 20 so that half the fluid flowing through the tube 38 will pass through the tubes 20 of sections 6 and 8 and the other half through the tubes 20 of sections 2 and 4. The proportioning is also such that approximately one-fifth of the total fluid passes through the tubes 20 of the lowermost section 10. Control of this flow is additionally effected through the discharge tubes 42 and 50, which are also proportioned to each other so as to secure substantially uniform conditions in all of the sections. It is unnecessary to describe the calculations to arrive at this in detail herein, because, as will be obvious, the relationships of the tubes depend upon the viscosity and density of the material being used as heat exchange medium. The known conditions of flow through tubes of different sizes for liquids of different viscosities and densities may be readily applied to the attainment of the proper proportions. Entrance conditions into the various tubes must also be taken into account. The methods of calculating proportions to obtain these results are well known to the art.

The structural features of the invention are also important. It is desirable that the various sections may be taken apart for cleaning and for replacement of the catalyst. For this purpose they are provided with flanges as indicated, arranged to be bolted together by bolts indicated at 52. The headers 18 and 16 may be conventionally spaced by annular flanges as indicated at 54, secured by bolts to the headers 18 and welded to the headers 16. The various tubes 38, 46, 42 and 50 may be formed in two parts releasably coupled together as indicated at 56. Flexible seals (not shown) are preferably provided at the joints to engage the headers 16.

It will be noted that the arrangement described provides alternate distributing and gathering chambers with means connecting successive distributing chambers and means connecting successive gathering chambers in such fashion that a heat exchange fluid is supplied to the groups of heat exchange tubes of the various sections in parallel fashion. It will be obvious that the ends of the invention may be accomplished with various changes in details without departing from the scope of the invention.

What I claim and desire to protect by Letters Patent is:

1. Heat exchange apparatus comprising a series of alternate distributing and gathering chambers, a group of heat exchange tubes connecting each pair of adjacent chambers, an enclosure surrounding each group of heat exchange tubes, means providing for the entrance of fluid into each of said enclosures and exit of fluid from each of said enclosures whereby the fluid may pass about said tubes, means connecting successive distributing chambers, and means providing for the exit of fluid from the gathering chambers, so that a second fluid provided for heat interchange with the first mentioned fluid may flow from each distributing chamber into the adjacent gathering chambers through groups of said heat exchange tubes, and additionally to the next distributing chamber.

2. Heat exchange apparatus comprising a series of alternate distributing and gathering chambers, a group of heat exchange tubes connecting each pair of adjacent chambers, an enclosure surrounding each group of heat exchange tubes, means providing for the entrance of fluid into each of said enclosures and exit of fluid from each of said enclosures whereby the fluid may pass about said tubes, means connecting successive distributing chambers, and means connecting successive gathering chambers, so that a second fluid provided for heat interchange with the first mentioned fluid may flow from each distributing chamber into the adjacent gathering chambers through groups of said heat exchange tubes, and additionally to the next distributing chamber.

3. Heat exchange apparatus comprising a series of alternate distributing and gathering chambers, a group of heat exchange tubes connecting each pair of adjacent chambers, an enclosure surrounding each group of heat exchange tubes, means providing for the entrance of fluid into each of said enclosures and exit of fluid from each of said enclosures whereby the fluid may pass about said tubes, means extending through the said enclosures connecting successive distributing chambers, and means providing for the exit of fluid from the gathering chambers, so that a second fluid provided for heat interchange with the first mentioned fluid may flow from each distributing chamber into the adjacent gathering chambers through groups of said heat exchange tubes, and additionally to the next distributing chamber.

4. Heat exchange apparatus comprising a casing formed of more than two separable cylindrical sections arranged in an axially extending series, each of said sections including an enclosure having a group of heat exchange tubes extending axially therethrough, means providing for the entrance of fluid into each of said enclosures and exit of fluid from each of said enclosures whereby the fluid may pass about said tubes, and means for supplying a second fluid in parallel to the groups of heat exchange tubes of the various sections.

5. Heat exchange apparatus comprising a casing formed of more than two separable cylindrical sections arranged in an axially extending series, each of said sections including an enclosure having a group of heat exchange tubes extending axially therethrough, means providing for the entrance of fluid into each of said enclosures and exit of fluid from each of said enclosures whereby the fluid may pass about said tubes, and means for supplying a second fluid in parallel to the groups of heat exchange tubes of the various sections, so that in alternate groups of tubes flow therethrough takes place in opposite directions.

6. Heat exchange apparatus comprising a casing formed of more than two sections arranged in an axially extending series, each of said sections including an enclosure having a group of heat exchange tubes extending axially therethrough, means providing for the entrance of fluid into each of said enclosures and exit of fluid from each of said enclosures whereby the fluid may pass about said tubes, means for supplying a second fluid in parallel to the groups of heat exchange tubes of the various sections, and means comprising conduits for the second fluid proportioned relatively to each other and to said heat exchange tubes to provide substantially the same flows of said fluid through the various groups of heat exchange tubes.

WALTER SAMANS.